Nov. 9, 1965 R. P. NAIL 3,216,317

TRANSPOSITION DEVICE AND DOCUMENT PROCESSOR IN CHARACTER SENSING

Filed Sept. 7, 1962 2 Sheets-Sheet 1

INVENTOR

Robert P. Nail

BY John R. Manning

ATTORNEY

United States Patent Office 3,216,317
Patented Nov. 9, 1965

3,216,317
TRANSPOSITION DEVICE AND DOCUMENT PROCESSOR IN CHARACTER SENSING

Robert P. Nail, Grand Prairie, Tex., assignor to Sperry Rand Corporation, New York, N.Y., a corporation of New York Filed Sept. 7, 1962, Ser. No. 221,985
5 Claims. (Cl. 88—24)

This invention relates to a transposition device for a character recognition system and more specifically to means for alternating the relative position or order of identifiable characters appearing on a character bearing document when transferred to the face of a camera tube character scanning means.

Many retail business establishments conduct extensive credit transactions. In this area of business, the metal or plastic charge plate has proved to be a convenient means for use in identifying the customer by an account number on the charge invoice or sales slip that is prepared. By this means the document is readily machine readable. In addition to the identifying number or account number of the customer, the charge recorder may include means to place upon the sales slip the cash amount of the transaction as well as the quantity or other identifying characteristics.

Character recognition systems employ a scanner to read the characters upon the document. Signals are derived from the scanner which are characteristic of the particular character scanned. The signals so derived are interpreted by electronic or electical equipment to determine the character scanned. Such character scanners pesently in use include mechanical whirling disk scanners, cathode ray tubes, banks of photo-electric cells, and camera tubes of the television type. The scanner of the present invention employs a camera tube which is capable of scanning the characters by an electronic beam after the characters have been recorded upon the mosaic of the face of the camera tube. The face of the camera tube is small, usually about one inch in diameter. Since the character bearing documents are much larger than the diameter of the face of the tube and have the information to be processed randomly disposed upon the document, some means must be employed to position the character upon the face of the camera tube in such a manner that the internal scanning means of the camera tube may be readily employed to generate the characteristic output signals by scanning the characters reflected upon the face of the tube. In addition, means must be employed to provide a light source for illumination of the document to provide a light path from the document through a lens and mirror system to the face of the camera tube.

As a consequence, it is desirable that means be employed to accurately and quickly transfer the image of the desired information from the character bearing document to the camera tube in such a manner that the beam scanning circuits of the tube may readily scan the image of the characters so transferred, and derive the character output signals. In addition, the system must be flexible in that it must be able to be readily adopted to accommodate various size documents and must be movable to permit proper focusing and removal of document jams.

Accordingly, it is the principle object of the present invention to improve character reading techniques.

It is another object of the present invention to improve transposition techniques from a character bearing document to the face of the character scanning means.

It is a further object of the present invention to provide a means for selecting the desired information from a character bearing invoice and transferring this information to the face of a camera tube.

It is a still further object of the present invention to employ means for reading a character bearing document while in motion and transferring the desired information to a character scanner.

Character bearing documents are transported along a transport way by any conventional means such as an arrangement of belts, pulleys and idler wheels. When the character bearing document reaches the reading station, means are employed to cause a light source to strobe, thus illuminating the character bearing instrument. The strobe light is of such duration that the motion of the character bearing document appears to have been halted although the document continues to a recording station and to an output hopper. A mirror and lens system secured with an appropriate housing, focuses the desired information; such as the account number and the cash amount of the sale, on the character bearing document, through a channel to the face of the tube in such a manner that scanning circuits of the camera tube may scan the characters so transferred to its face and thus derive the characteristic output signals as a result of scanning the particular characters. Means are employed to position the camera upon the camera mount and also to position the camera and the camera mount relative to the reading station.

Further features and objects of the invention will be found throughout the more detailed description and a better understanding of the invention will be afforded by the following detailed description considered in conjunction with the accompanying drawings in which.

Figure 1:
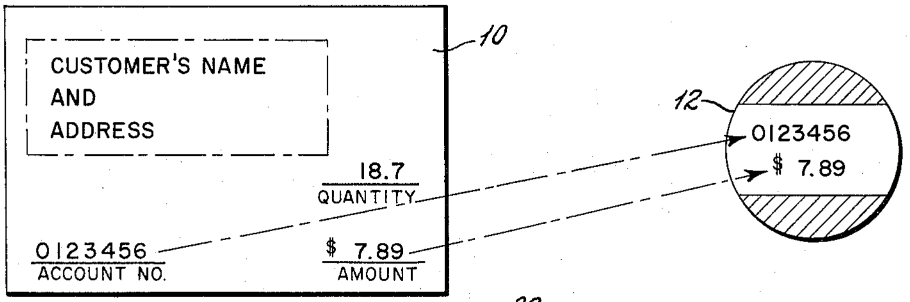
FIGURE 1 is a view of typical invoice or sales slip and a display of how the character fields are transposed during transfer from the invoice to the face of the camera tube.

As shown in the FIGURE 1, the invoice 10, in addition to having the name and address of the customer imprinted thereon, retains as a result of a previous imprinting operation, the account number, the cash amount of the sale, and the quantity of the sale, as shown. The invoice or sales slip 10 may vary in size from approximately a 2½ inch square to the size of an 80 or 90 column punched card. The right hand portion of FIGURE 1 shows the face of a camera tube 12 with the customer's account number and the cash amount of the sale transposed in position on the face of the tube for scanning by the internal beam of a camera 14. If the quantity of the sale is deisred on the camera face 12, suitable adjustment of the mirror assembly to be hereinafter described will accommodate this information.

Figure 2:
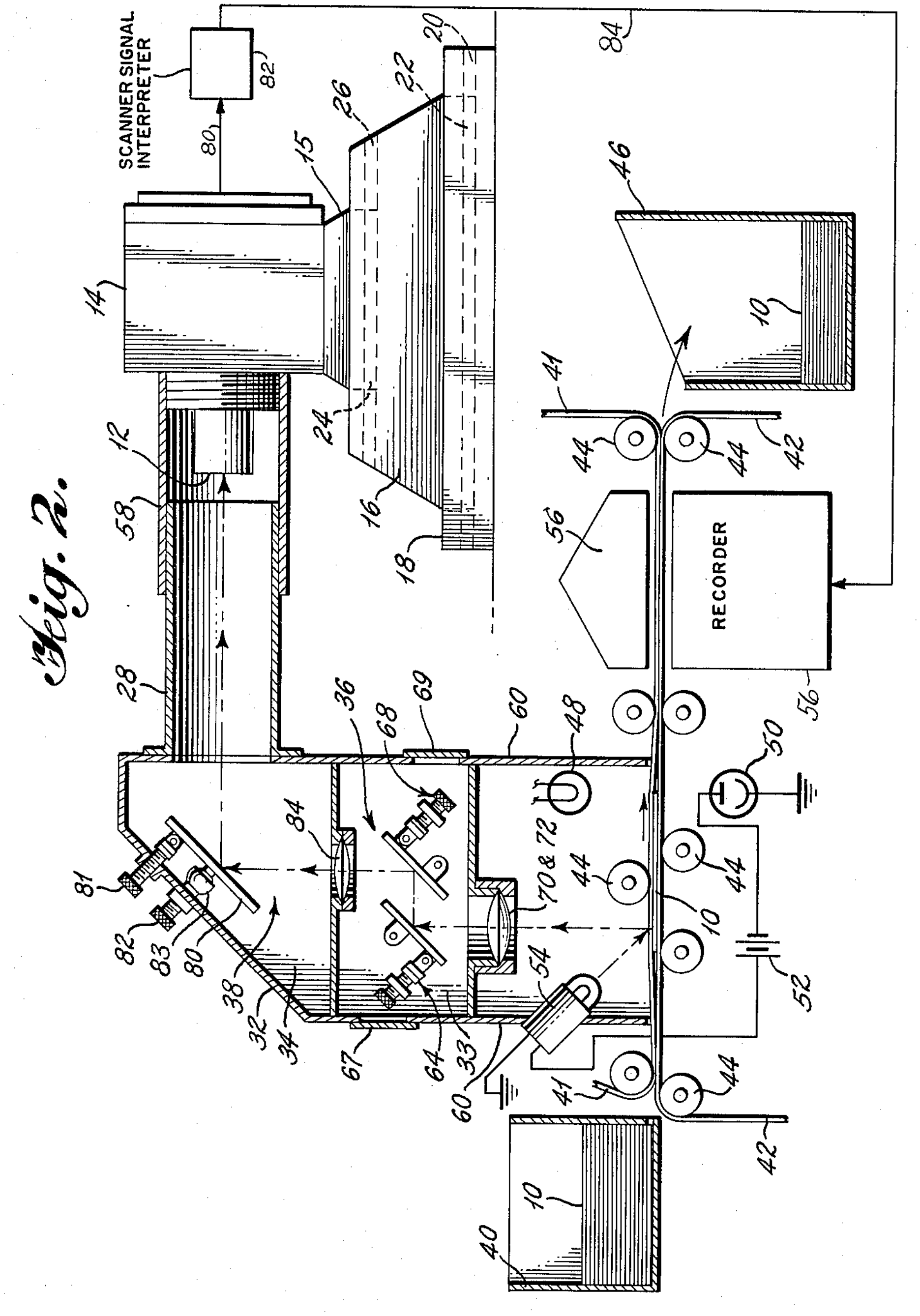
FIGURE 2 is a front elevation of the transposition device.

As shown in the FIGURE 2, the camera 14 having the lens or face 12 attached thereto, is disposed upon a camera mount 16. The camera mount 16 is mounted for relative movement between both a base member 18 and the camera 14. The camera mount 16 has a rail 22 horizontally affixed thereto along its lower edge and adapted to slide within a mating slide way 20 (shown in front view only due to its simplicity) on the base member 18. A force exerted on the camera mount 16 will move the entire assembly left or right with respect to the base member 18, as desired. Thus positioning of the document with respect to the lens and mirror arrangement may be effected in this manner and in the case of a document jam, it is desirable to be able to remove the transposition device to clear the jam.

Similarly, the camera 14 may be moved left or right with respect to the camera mount 16 and the mirror and lens assembly to be hereinafter described. The base 15 of the camera 14 has a horizontally mounted rail 24 affixed thereto and parallel to the lower rail 22. Parallel to the mating slide way 20 in the base member 18 is a mating slide way 26 in the camera mount 16 and adapted to cooperate with the upper rail 24 mounted on the base 15 of the camera 14. A force exerted against the camera 14 while the camera mount 16 is held stationary, will permit movement of the camera 14 with respect to the mount 16 and the mirror and lenses assembly, to be hereinafter described. This operation will permit focusing of the document 10 on the face 12 of the camera 14.

An horizontal extension 28 is coupled to the mirror and lens assembly and is mounted for slidable movement within a camera extension 58. The camera extension 58 may be mounted on the camera by any suitable means. Movement of the camera 14 upon the camera mount 16 will permit the camera extension 58 to move relative to its mating extension 28. The horizontal extension 28 and its mating camera extension 58 serve to house the light path from the upper mirror to the face 12 of the camera 14 and may be of cylindrical cross section, square or rectangular or other cross section and capable of keeping out any external light.

The horizontal extension 28 includes a perpendicularly mounted housing 32 having an upper compartment 34 for the secondary mirror and lens assembly 38 and a lower compartment 33 for the primary mirror and lens assembly 36.

Extending downwardly from the lower compartment 33 of the housing 32 is a hood 60 which serves to shield the card or document read area from extraneous or unwanted light. The hood 60 may be of a rigid material or may be of a flexible material. The primary mirror and lens assembly 36 and the secondary mirror and lens assembly 38 will be described in detail with reference to FIGURE 3.

The cards or invoices 10 of the FIGURE 2, are contained in a document input hopper 40 and may be fed from the hopper 40 by any suitable means to an upper belt 41 and a lower belt 42. The belts 41 and 42, engaging a group of coacting and cooperating pulleys 44 mounted upon suitable shafts to permit rotational movement thereof and driven thereby, provide a horizontal document way from the document input hopper 40 to a document output hopper 46. The upper belt 41 and the lower belt 42 engage the invoices 10 and provide a positive movement of the documents from the input hopper 40 to the output hopper 46.

To provide illumination for transposing the desired information from the invoice 10 to the face 12 of the camera tube, a light source 48, in conjunction with a photo electric pickup 50, will detect the presence of a document 10 at the read station immediately below the primary mirror and lens assembly 36. The output from the photo electric pickup 50 on its conductor is connected to a power supply 52 to actuate a strobe light 54 to provide the necessary illumination.

After the light source 48 and the photo electric pickup 50 have detected the presence of a card by the leading edge of the card 10 disrupting the light beam from the light source 48 to the pickup 50, and the strobe source 54 has been actuated, the transposition of the information from the card or document 10 will be directed as shown through the primary mirror and lens assembly 36 to the secondary mirror and lens assembly 38 and to the face of the camera tube 12. The phosphors of the face 12 of the camera 14 are of such persistence that the image of the transposed information remains for a length of time sufficient for the scanning circuits of the camera 14 to scan the characters and thus derive the characteristic output signals indictative of the particular character scanned. These signals are conveyed over a cable 80 to a scanner signal interpreter 82 which may be of a type disclosed in co-pending application Serial No. 107,488, filed May 3, 1961, and assigned to the same assignee as the present application. The interpreter 82 may then generate signals over a cable 84 to a device 56 for recording the information on the documents in a second manifestation.

After the document 10 passes the reading station, the belts 41 and 42 transport the document 10 to the recorder 56 and then to the document output hopper 46. The recorder 56, may be for example, a punching station to perforate the document 10 in accordance with the information transposed.

Figure 3:
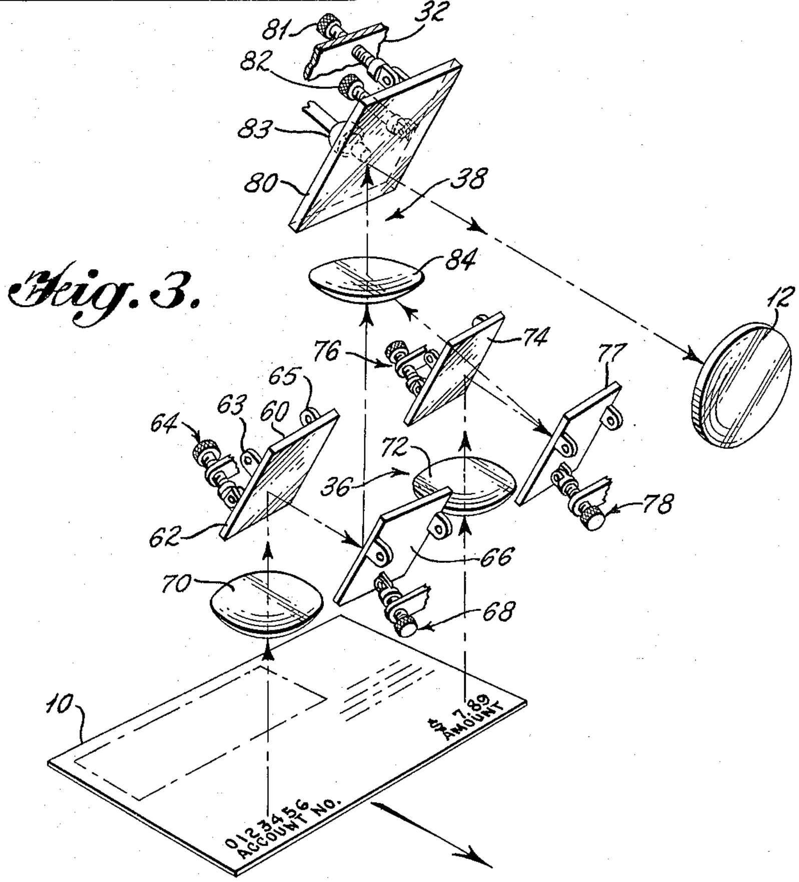
FIGURE 3 is a perspective view of the lens and mirror assembly of FIGURE 2.

The primary mirror and lens assembly 36 and the secondary mirror and lens assembly 38 are shown in detail in the FIGURE 3. The primary mirror and lens assembly 36 is suitably mounted in the lower compartment 33 of the housing 32 and includes, for the account number transposition, the mirrors 62 and 66, the lens 70, and their associated adjusting mechanisms 64 and 68 and for the cash amount of sale transposition, the lens 72, mirrors 74 and 77, and their associated adjusting mechanisms 76 and 78. The secondary mirror and lens assembly 38 includes the lens 84, the mirror 80, and its adjusting means 81, 82 and 83.

The mirror 62 is positioned above the document 10 to receive the image of the account number as shown on the document. The mirror 62, as are the other mirrors, is mounted within the lower compartment 36 and is secured for movement at the extensions 63 and 65. An adjusting means 64 includes a knurled screw, having an end connected to the lower portion of the mirror 62, passing through a threaded extension mounted to the inside of the compartment 33. Rotation of the screw permits movement of the mirror and focusing and adjustment thereof. In the FIGURE 2, the plates 67 and 69, mounted on the housing 32, when removed, permit access through holes in the housing 32 to the adjusting means of the mirrors. The adjusting means 64 permits adjustment of the mirror to reflect the account number from the mirror 62 to a second mirror 66. An adjustment means 68 is affixed to the mirror 66 and operates in a manner similar to the means of the mirror 62. The lens 70 is optional and may be added if the distances and quality of information require its presence. The amount of the sale on the document 10 is reflected through a lens system similar to that employed for transposing the account number which includes the lens 72 to a third mirror 74. Adjusting means 76 is connected to the mirror 74 to permit adjustment thereof. Light from the mirror 74 is reflected to a fourth mirror 77 and an adjusting means 78 permits adjustment of the mirror 77. The account number, reflected from the mirror 66 and the amount of the sale, reflected from the mirror 77 are directed to the secondary mirror and lens assembly 38 comprising a single mirror 80. The mirror 80 is capable of adjustment in two planes. If deemed necessary, the mirrors 62, 66, 74 and 77 may be mounted in a manner similar to be herein described.

The mirror 80 is connected for pivotable movement about a stud supporting a socket 83. The stud is suitably supported within the housing 34 and has an end secured against the mirror 80. The threaded pin 81 passes through a threaded portion of the housing 32 and connects with the mirror 80 to permit movement in one plane. Similarly, the threaded pin 82 permits movement of the mirror 80 in the other plane. By adjustment of the threaded pins 81 and 82, the mirror 80 will be caused to reflect the image from the mirror 66 and 77 through the lens 84 (if used) to the face 12 of the camera tube 14. A lens 84 may be employed if conditions require its use. The light path received from the mirrors 66 and 77 to the mirror 80 are such that the transposition of the cash amount of sale under the account number, as shown in the FIGURE 1 has taken place and the mirror 80 serves to transmit the light beams to the face 12 of the camera 14. The lens and focusing elements of the primary mirror and lens assembly 36 and the secondary mirror and lens assembly 38 are rigidly secured within the housing 32 and adjustment of the focusing is permitted by the adjusting means coupled to the mirrors hereinbefore described.

Thus, there has been described a transposition device capable of passing documents exhibiting information in one manifestation such as conventional or stylized characters along a card way and actuating a strobe light to permit illumination of the document. A primary mirror and lens assembly is employed to transpose the light rays of the account number and the cash amount of the sale from any position on the document to a secondary mirror and lens assembly. The secondary mirror and lens assembly then transmits the account number and cash amount of the sale into appropriate positions on the face of a camera tube such that the face of the tube, being much smaller in comparison to the document, is capable of utilizing the internal circuits of the camera to scan the characters and thus derive characteristic output signals indicative of the particular characters scanned. Means are employed to receive these output signals and cause a recorder positioned along the document path, to exhibit on the document the information in a second manifestation. By suitable adjustment of the mirror and lens assembly, the transposition may be in a vertical as well as a horizontal plane or the image focused on the face of the camera tube may be reversed if this is more suitable for character scanning by the electron beam of the camera. A suitable housing is supplied to keep out the extraneous light. In addition, means are provided to move the camera within the structure to permit focusing and additional means are employed to permit removal of the device to clear document jams.

The invention may be embodied in other specific forms without departing from the spirit and essential characteristics of my invention. The present embodiment is, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. A document processor for presenting widely separated fields of information-bearing characters on a document to an optical character scanning device comprising a document hopper for supporting character-bearing documents, a light-tight first chamber, means for successively advancing a document from said document hopper through said first chamber, a strobe light positioned within said first chamber for illuminating a document, document detecting means coupled to actuate said strobe light upon the passage of a document past a predetermined point, a second chamber disposed at right angles to and communicating with said first chamber and said optical character scanning device, a base member, means supporting said optical character scanning device on said base member for permitting relative movement therebetween for accomplishing a focusing operation, and a mirror assembly disposed within said first chamber for transposing a pair of widely separated fields of characters in an area on a document as a document traverses said first chamber to an appreciably smaller area for presentation to said optical character scanning device, said mirror assembly including a first group of optical devices for transposing one of the fields of characters and a second group of optical devices for transposing the other of the fields of characters, each of said groups of optical devices including a lens positioned above their respective character field, a first mirror for receiving the images formed through said lens, and a second mirror positioned to direct the path of light from said first mirror to a lens common to both said first and second groups of optical devices, and an adjustable mirror positioned above said lens common to both groups to form a light path from said first chamber through said second chamber to said optical character scanning device.

2. The combination as defined in claim 1 wherein said optical character scanning device is a camera tube.

3. The combination as defined in claim 1 wherein said first and second groups of optical devices include individual adjusting means.

4. A document processor for presenting widely separated fields of information-bearing characters recorded on a document in one manifestation to an optical character interpreting device for exhibiting the information on the document in a second manifestation comprising an input hopper for supporting documents having information recorded thereon in separated fields in the form of characters, a light-tight first chamber, means for successively advancing a document from said document hopper through said first chamber, a strobe light positioned within said first chamber for illuminating a document, document detecting means coupled to actuate said strobe light upon the passage of a document past a predetermined point, an optical character scanning device for producing characteristic output signals in response to the presentation of characters recorded in the one manifestation, a second chamber disposed at right angles to and communicating with said first chamber and said optical character scanning device, a base member, means supporting said optical character scanning device on said base member for permitting relative movement therebetween for accomplishing a focusing operation, interpreting means for receiving the characteristic output signals from said optical character scanning device and producing outputs indicative of the characters scanned, means positioned along the document path and coupled to receive the outputs of said interpreting means for causing the information on the document to be exhibited in a second manifestation, and a mirror assembly disposed within said first chamber for transposing a pair of widely separated fields of characters in an area on a document as a document traverses said first chamber to an appreciably smaller area for presentation to said optical character scanning device, said mirror assembly including a first group of optical devices for transposing one of the fields of characters and a second group of optical devices for transposing the other of the fields of characters, each of said groups of optical devices including a lens positioned above their respective character field, a first mirror for receiving the image formed through said lens, and a second mirror positioned to direct the path of light from said first mirror to a lens common to both said first and second groups of optical devices, and an adjustable mirror positioned above said lens common to both groups to form a light path from said first chamber through said second chamber to said optical character scanning device.

5. The combination as defined in claim 4 wherein said means for exhibiting data on the document in a second manifestation is a punch.

References Cited by the Examiner

UNITED STATES PATENTS

| | | | |
|---|---|---|---|
| 2,223,334 | 11/40 | Robison. | |
| 2,753,758 | 7/56 | Walker | 88—24 |
| 2,754,722 | 7/56 | Howell et al. | 88—24 |
| 2,782,678 | 2/57 | Taylor | 88—24 |
| 2,889,941 | 6/59 | Mehlis | 88—74 X |
| 2,947,218 | 8/60 | Hayden et al. | 88—24 |
| 3,055,261 | 9/62 | Braun et al. | |

NORTON ANSHER, *Primary Examiner.*

WILLIAM MISIEK, *Examiner.*